United States Patent [19]

Signoretto

[11] Patent Number: 4,779,122

[45] Date of Patent: Oct. 18, 1988

[54] APPARATUS FOR CREATING AND CHECKING CORRELATION BETWEEN NEGATIVES AND PRINTS IN PHOTOGRAPHIC LABORATORIES

[75] Inventor: Roberto Signoretto, Olmo Di Martellago, Italy

[73] Assignee: Roberto Signoretto-Photo Engineering Int. S.R.L., Venezia, Italy

[21] Appl. No.: 927,171

[22] Filed: Nov. 5, 1986

[30] Foreign Application Priority Data

Nov. 11, 1985 [IT] Italy .............................. 84153 A/85

[51] Int. Cl.⁴ ............................................ G03B 17/24

[52] U.S. Cl. .................................... 355/77; 354/105; 355/40

[58] Field of Search .................... 355/40, 77; 354/105, 354/109

[56] References Cited

U.S. PATENT DOCUMENTS

| | | | |
|---|---|---|---|
| 3,750,553 | 8/1973 | Pfeifer et al. | 354/105 |
| 3,836,246 | 9/1974 | Bowker | 355/40 |
| 3,987,467 | 10/1976 | Cowles | 354/105 |
| 4,384,786 | 5/1983 | Kuroda | 355/40 |
| 4,554,560 | 11/1985 | Kanaoka et al. | 354/105 X |
| 4,574,692 | 3/1986 | Wahli | 354/105 X |

*Primary Examiner*—Donald A. Griffin
*Attorney, Agent, or Firm*—Charles W. Fallow; Martin P. Hoffman; Mitchell B. Wasson

[57] ABSTRACT

The apparatus for creating and checking correlation between negatives and prints in photographic laboratories comprises:

means (3) for making each film (5,5′,5″) with a progressive number (4) written in machine-readable code, a reader (19) for said number (4) in the printing station, a processing circuit (8) for the read signal in order to provide a control key having a sequence related to said progressive numbering (4), a member (10) which forms the end-of-order marks (13) on the strip of prints (11), a member (9) which on the strip of prints (11) forms the cutting marks (12) and modifies those in positions corresponding with the end-of-order marks (13) in accordance with the sequence generated by said processing circuit (8), in the finishing station (1), a reader (19) for the number (4) which characterises each film (5,5′,5″), in the finishing station (16), a reader (20) for the cutting marks (12) in positions corresponding with the end-of-order marks (13), a circuit (22,27) which during the cutting stage checks that the same sequence exists both in the processed signal provided by said reader (19) for the number (4) which characterises each film (5,5′,5″) and in the processed signal provided by said reader (20) for the cutting mark (12), and a sensor (28) for sensing non-correspondence of the two sequences.

14 Claims, 2 Drawing Sheets

APPARATUS FOR CREATING AND CHECKING CORRELATION BETWEEN NEGATIVES AND PRINTS IN PHOTOGRAPHIC LABORATORIES

This invention relates to a method for creating and checking correlation between negatives and prints in photographic laboratories, and an apparatus for implementing the method.

Exposed films are currently developed and printed in photographic laboratories. In practice, the photographer customer hands the exposed film to the shop for development and printing, and the shop delivers it to the photographic laboratory together with the films received from other photographer customers, each previously inserted in an envelope known as the "processing envelope".

These films together with films originating from other shops are there extracted from the relative holder joined together to form a continuous strip (film reel), developed together, printed together on a continuous strip of photographic paper, then cut into individual photographs and finally reinserted, together with the negatives separated from the film reel, into the original processing envelope to be returned to the shops from which they originated.

The considerable problem which normally arises in this type of processing is, after this series of operations, to return to the customer his own negatives and the photographs printed from them.

In other words, this means reinserting into the processing envelope the negatives and positives corresponding to the holder originally inserted into that envelope by the shopkeeper. As in practice the average number of films processed daily by a laboratory is of the order of same thousands, it is immediately apparent that the problem of film-photograph-processing envelope correlation is a problem of such importance that if not solved it can give rise to extreme difficulties and responsibilities.

Apparatus have already been proposed for establishing correlation between the negatives and respective processing envelopes at the moment in which these are separated from each other at their entry into the photographic laboratory, and for then cheking this correspondence in the finishing station, ie at their exit from the photographic laboratory when the developed negatives and the printed photographs have to be inserted into each envelope.

In particular, apparatus have been already been proposed which enable this correspondence to be automatically established and checked, and provide a signal if it is not confirmed.

For checking the correspondence between photographs and negative, apparatus exist which display on one and the same screen the photographs televised by a telecamera and the corresponding negatives also televised by a telecamera, to allow direct comparison by the operator.

The drawback of such apparatus is that the correspondence check is visual and as such is slow, requires the constant presence of the operator and is often influenced by his tiredness.

To obviate this drawback an apparatus has already been proposed, for the specific case of photographic films on disc, which automatically reads the bar code printed on the disc, and during the printing of the photograph reproduces this bar code on the rear of a photograph of each order, so allowing the number thus printed and the number present on the disc to be automatically read and compared in the finishing station.

The drawback of this method is that printing the number in bar code on the rear of the photograph requires the use of a thermal transfer printer, ie an apparatus which besides being costly and of complex operation cannot be made to operate directly on the polyethylene coating which normally forms the lower layer of the paper. For this reason it has been proposed to interpose between the thermal printer and the photographic paper a carbon ribbon on which said printer acts in order to transfer on to the photograph the numbers written in bar code.

The result is a further weight increase in the apparatus, the need to frequently replace the carbon ribbon which obviously wears, and an overall size such as to make it unsuitable for application to pre-existing apparatus.

The object of the invention is to obviate these drawbacks and to finally and completely solve the problem of automatically establishing correspondence between films and photographs during developing and checking that this correspondence still exists during finishing.

The invention is based on the consideration that in the photograph printing station, ie when the images contained in the negatives are printed on to a continuous strip of photosensitive paper, it is usual to apply to each print a reference mark which is later used by a cutter in the finishing station for automatically cutting the individual photographs, and to also apply an "end-of-order" mark which separates the prints of one order from the prints of the next order. These marks can be formed either on the photographic image side by a paper photosensitisation process, or can be obtained by punching in proximity to the edges of the continuous paper strip in the interspace between two successive photographs, or again can be obtained on the rear of the photographs by an impact printing method using typing ribbon or by writing with graphite or a ball-point pen.

However the cutting marks are made in proximity to one longitudinal edge of the photographic paper strip, whereas the end-of-order marks are made in proximity to the opposite longitudinal edge.

The invention solves the aforesaid problem by creating with these marks a control key by means of which it is possible to check correct synchronism between the negatives and prints during their cutting in the finishing station.

This problem is solved according to the invention by a method for creating and checking correlation between negatives and prints in photographic laboratories characterised by:

- forming a continuous strip from the negatives pertaining to the different orders, and marking each negative with a progressive number in machine-readable code,
- reading said number during the printing stage and processing it to obtain a control key having a sequence related to said numbering progression,
- on the basis of this sequence modifying the print cutting mark in positions corresponding with the end-of order mark as the marks are about to be formed, and
- during the cutting stage checking that this sequence exists both in the numbering which characterises each film and in the corresponding control key read from the print marks.

Again according to the invention, each film can be marked by applying to it a label on which said progressive number is printed.

In a different embodiment of the invention, each film can be marked by progressively numbering the actual label with which said film is joined to the proceeding to form a continuous strip.

Advantageously, the sequence used can be a binary sequence, preferably related to the parity of the number which marks each film.

Again according to the invention, in the cutting marks in positions corresponding with the end-of-order marks a sequence can be created corresponding to the binary sequence by suspending the formation of the cutting mark every two end-of-order marks.

In order to prevent any error deriving from possible non-formation or non-reading of the end-or-order marks, the presence of an end-of-order mark can be checked in correspondence with the position in which the cutting mark has been modified.

To implement the aforesaid method, the invention provides for the use of an apparatus comprising:

means for marking each film with a progressive number written in machine-readable code, a reader for said number in the printing station, a processing circuit for the read signal in order to provide a control key having a sequence related to said progressive numbering, a member which forms the end-of-order marks on the strip of prints, a member which on the strip of prints forms the cutting marks and modifies those in positions corresponding with the end-of-order marks in accordance with the sequence generated by said processing circuit, in the finishing station, a reader for the number which characterises film, in the finishing station, a reader for the cutting marks in positions corresponding with the end-of-order marks, a circuit which during the cutting stage checks that the same sequence exists both in the processed signal provided by said reader for the number which characterises each film and in the processed signal provided by said cutting mark reader, and a sensor for sensing non-correspondence of the two sequences.

A preferred embodiment of the present invention is described in detail hereinafter by way of non-limiting example with reference to the accompanying drawings, in which.

Figure 2:
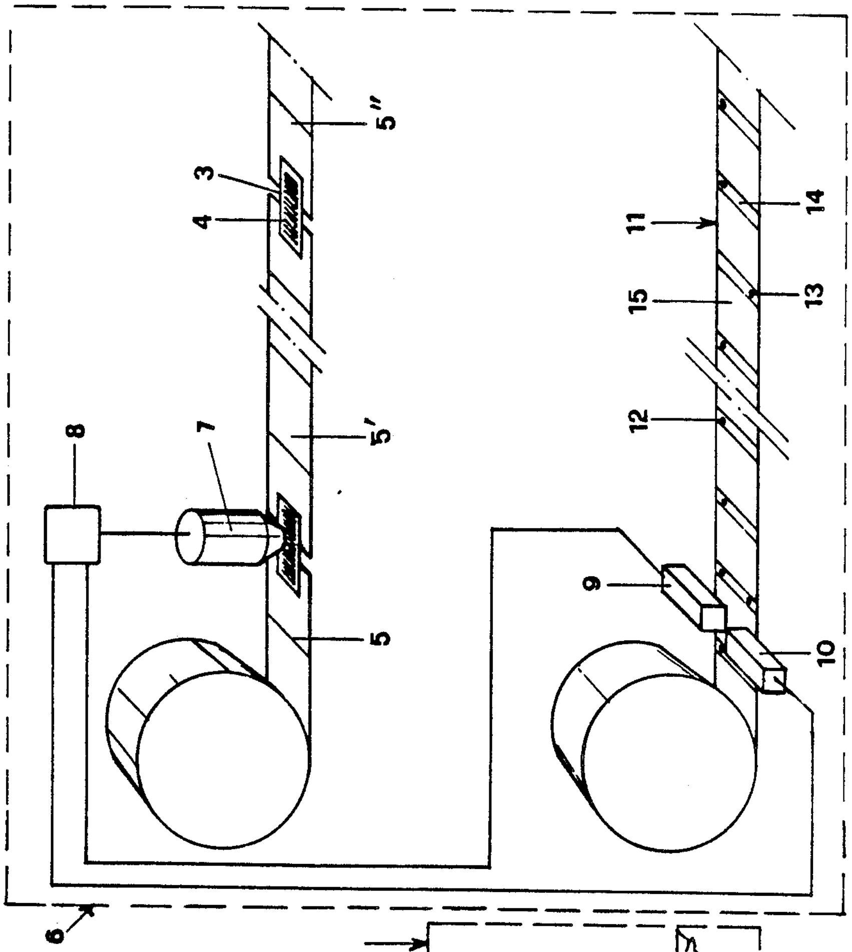
FIG. 2 is a diagrammatic view of the printing station, in which a part of the apparatus according to the invention is applied.
Figure 1:
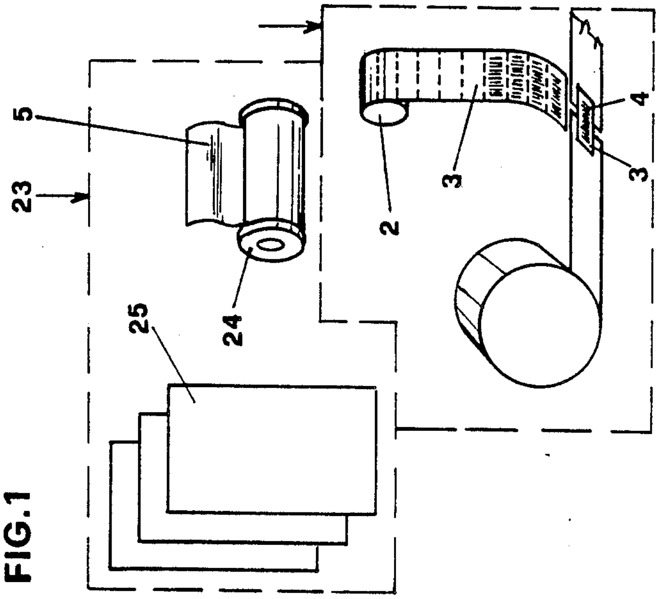
FIG. 1 is a diagrammatic view of the joining station of a photographic laboratory provided with the apparatus according to the invention.
Figure 3:
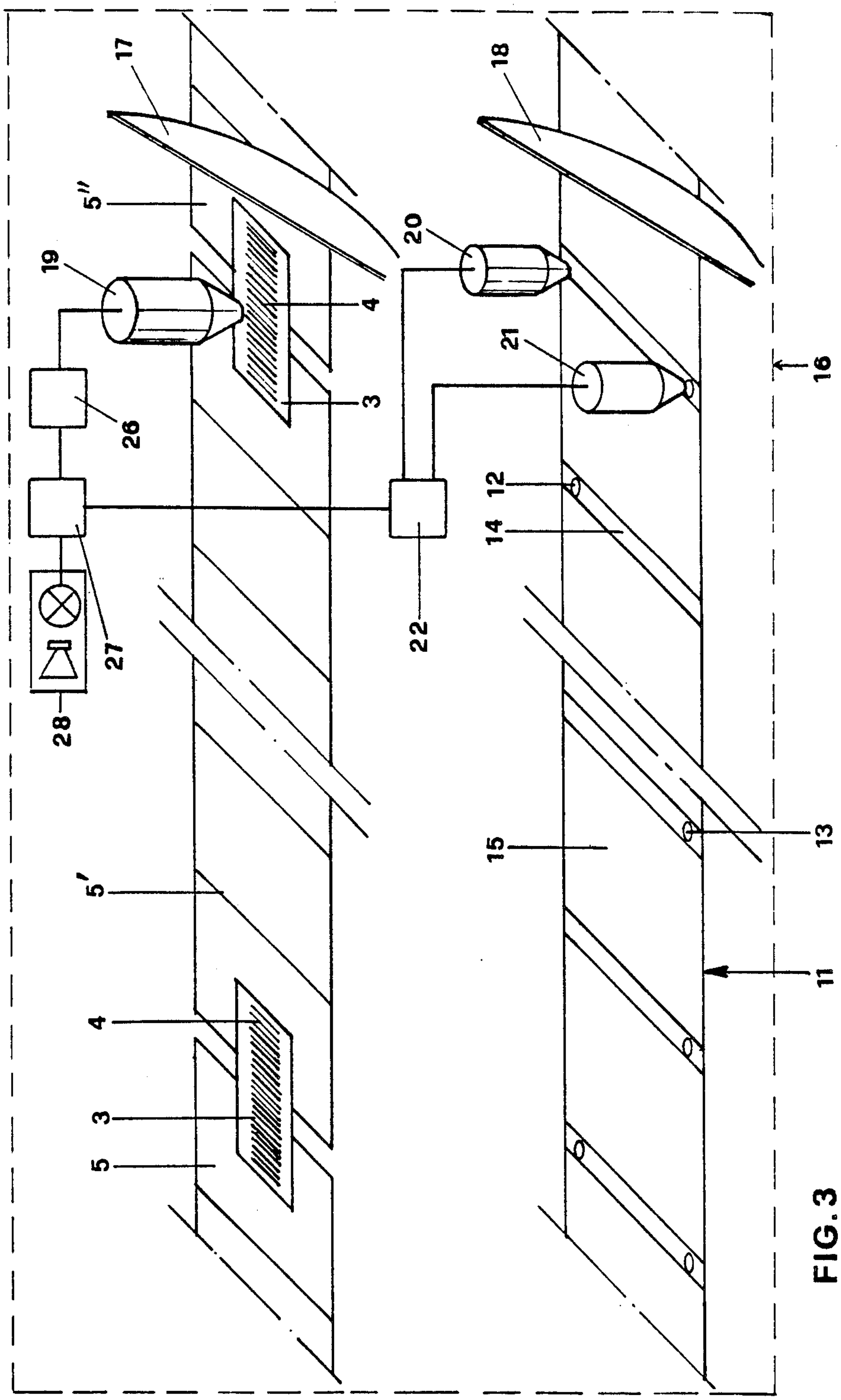
FIG. 3 is a diagrammatic view of the finishing station, in which the remaining part of the apparatus according to the invention is applied.

As can be seen from the figures the apparatus which implements the method according to the invention comprises in the joining station 1 a roll 2 of labels 3 numbered progressively with a bar code and arranged to be applied between the adjacent ends of two photographic films 5, 5' pertaining to two different orders.

The apparatus also comprises, in the printing station 6, a reader 7 for the number 4 printed on the labels 3. The output of the reader 7 is connected to a microprocessor 8, the purpose of which is to decode the signal received from this latter and to process it in order to convert it into a control key having a sequence related to the progression of the numbers 4 on the labels 3.

In the printing station 6 there are also provided two devices 9 and 10, for example of electromagnetic type, which are also connected to the microprocessor 8, their purpose being to form on the strip of prints 11 the cutting marks 12 and end-of-order marks 13.

A description of the method of operation of the devices 9 and 10 is omitted as these are of conventional type and do not form part of the invention. It will merely be stated that the device 9 forms a mark 12 at a constant rate in proximity to the left hand edge of the advancing strip of prints 11 in correspondence with the narrow transverse separation (or superimposing) band 14 between two adjacent prints 15 whereas the device 10 forms a mark 13 in proximity to the right hand edge of the strip 11 in correspondence with the transverse separation (or superimposing) band 14 between the last print of one order and the first print of the next order.

The apparatus according to the invention also comprises in the finishing station 16, ie in the station comprising inter alia the negative cutter 17 and the print cutter 18, a reader 19 for the labels 3, a reader 20 for the cutting marks 12, a reader 21 for the end-of-order marks 13 and a control circuit 22 for the two readers 20, 21.

The operation of the apparatus according to the invention is as follows:

the holder 24 containing the film 5 to be developed is removed from the processing envelope 25 in the arrival station 23 of the photographic laboratory. The film 5 to be developed is then extracted from the holder 24 and is joined to the preceding films by a label 3 provided with a number 4 written in bar code or other machine-readable code. As stated the label 3 is withdrawn from the roll 2 on which the various labels are numbered progressively. The number present on the label 4 is read by a reader (not shown on the drawings) and automatically printed on the processing envelope 25, so as to create between the negatives and envelope a correlation which accompany both until they are reunited in the finishing station 16.

The continuous strip formed from all the films 5 is then fed to the developing station and then to the printing station 6. Here, as the film strip 5 and paper strip 11 advance, the images corresponding to the individual frames to be printed are projected on to the paper strip, which thus becomes sensitised.

Simultaneously, the member 9 for forming the cutting mark 12 is operated at each step in synchronous relationship with the advancement of the two strips. However when all the photographs relative to that particular order have been printed and the time has come to operate the member 10 for forming the end-of-order mark 13, the cutting mark 12 is either formed or not formed according to the digital signal provided by the microprocessor 8.

In this respect when the reader 7 reads an odd number 4 on the label 3, the corresponding processed signal leaving the microprocessor 8 keeps the control circuit of the device 9 open so preventing it from forming the cutting mark 12, whereas if the reader 7 reads an even number 4, the processed signal leaving the microprocessor 4 closes this control circuit.

Thus in practice the paper strip 11 leaving the printing station 6 and carrying printed thereon the various photographs 15 to be separated in the subsequent finishing station 16 comprises in proximity to its right hand edge, with reference to the direction of advancement, a plurality of end-of-order marks 13 which separate the last print of one order from the first print of the next order. The paper strip 11 also comprises in proximity to the opposite edge a cutting mark 12 which separates each print from the next. However the cutting mark 12 is present only alternatively in correspondence with each end-of-order mark 13. Thus the configuration of the print strip leaving the printing station 6 can be for example as shown in FIGS. 2 and/or 3.

When the film strip and print strip reach the finishing station 16, the two readers 20 and 21 read the cutting and end-of-order marks and correspondingly control the cutters 17 and 18 by conventional methods. It should be noted that the desultory absence of the cutting mark 12 does not prejudice correct operation of the print cutter 18 in that this absence is compensated by the certain presence of the end-of-order mark 13, which in this case control the cutter.

Furthermore in the finishing station 16 the reader 19 of the labels 3 transmits to a control logic circuit 27 the signal deriving from the reading of the number 4, after coding and processing the microprocessor 26. The purpose of the control logic circuit, which also receives a signal from the circuit 22, is to control the synchronism between the positives and negatives. in this respect, to attain correct synchronism, the cutting mark 12 has to be present or absent in correspondence with each end-of-order mark 13 with an alternation identical to the alternation of the even and odd numbers 4. In the case of non correspondence, the machine operating cycle is halted and an optical and/or acoustic alarm 28 is simultaneously activated.

If the end-of-order mark 13 on which the aforesaid operation is based have not correctly formed or read, the apparatus according to the invention is able to immediately sense this. In this respect, once the reading frequency of the cutting marks 12 has reached a constant value, any lack of presence of an end-of-order mark 13 in correspondence with a separation band 14 in which the cutting mark 12 is also absent means that an error exists, and this results in an alarm signal.

From the aforegoing it is apparent that the apparatus according to the invention finally and completely solves the problems of automatic correlation between negatives, positive and processing envelopes in photographic laboratories.

In this respect, correlation between negatives and envelopes could already have been established by conventional methods, but the correlation which can now be established between positives and negatives allows complete automatic control of the entire processing cycle.

Moreover the apparatus according to the invention can be easily and rapidly fitted to already existing photographic laboratory machines. In this respect, it consists essentially of the microprocessor 8 to be connected between the reader 7 and the devices 9 and 10 in the printing station, and the microprocessor 26 to be connected into the checking circuit 22 for the readers 20 and 21 and into the control logic circuit 27 in the finishing station 16. From the physical aspect the entire assembly reduces to very small boxes and a few electrical connections, whoich substantially results in only minimum overall size and minimum cost.

I claim:

1. A method for creating and verifying correlation between negatives and paper prints in a photographic printing apparatus having a printing station and a finishing station, comprising steps of forming a continuous strip of negatives from a plurality of filmstrips pertaining to different orders, marking each of said filmstrips with a machine-readable control number, forming, in the printing station, on a continuous strip of photographic print material, print cut marks and end-of-order marks whose position is correlated with said machine-readable control numbers, reading, in the finishing station, said machine-readable control numbers and said print cut marks and end-of-order marks, verifying that the initial correlation between said print cut marks and end-of-order marks and machine-readable control numbers still exist in the finishing station, and signalling in the event of lack of said correlation.

2. A method as claimed in claim 1, characterized in that each film (5,5′,5″) is marked by applying to it a label on which said progressive number (4) is printed.

3. A method as claimed in claim 2, characterised in that each film (5,5=,5″) is marked by progressively numbering the actual label (3) with which said film is joined to the proceeding to form a continuous strip.

4. A method as claimed in claim 1 characterised by using a binary sequence.

5. A method as claimed in claim 4 characterised by using a binary sequence related to the parity of the number (4) which marks each film (5,5=,5″).

6. A method as claimed in claim 1, characterised by creating in the cutting marks (12) in positions corresponding with the end-of-order marks (13) a sequence corresponding to the binary sequence by suspending the formation of the cutting mark (12) every two end-of-order marks (13).

7. A method as claimed in claim 1 characterised by checking the presence of an end-of-order mark (13) in correspondence with the position in which the cutting mark (12) has been modified.

8. An apparatus for implementing the method of claim 1, comprising means for joining separate strips of film pertaining to different orders into a continuous strip and for marking each filmstrip with a machine-readable control number, a reader for reading said control number in the printing station and for producing a signal from which the control number can be reproduced, means in the printing station for forming cut marks and end-of-order marks on the edges of a strip of prints formed therein, a processing circuit controlling said members according to the signal received from said reader, a second reader for reading said control number in the finishing station, means for reading said cutting marks and end-of-order marks in the finishing station, a circuit for verifying that the correlation created in the printing station between the marks and the control number still exists in the finishing station, and means for signalling in the event of lack of said correlation.

9. An apparatus as claimed in claim 8, characterised in that the means for marking each film (5,5′,5″) with a progressive number (4) consist of the actual labels (3) which join together said films.

10. An apparatus as claimed in claim 8 characterised by comprising means for preventing the member (9) operating in correspondence with end-of-order marks (13), in accordance with the sequence generated by said processing circuit (8).

11. An apparatus as claimed in claim 8, characterised in that the processing circuit (8) for the reading signal provided by the reader (19) is of a type able to provide as output a signal of two different levels, according to whether the number (4) read by said reader (19) is even or odd.

12. An apparatus as claimed in claim 11, characterised by comprising a member for checking the presence of an end-of-order mark (13) in corrspondence with the position in which the cutting mark (12) has been modified.

13. An apparatus as claimed in claim 8, characterised by comprising in the finishing station (16) two readers (20,21) the units of which are connected to a checking circuit (22) which itself is connected to a control logic circuit (27), to which the signal read by the reader (19) is also fed after being processed.

14. An apparatus as claimed in claim 8, characterised in that the circuit (22,27) which during the cutting stage checks synchronism between prints and neatives is connected to a member for interrupting operation of the apparatus if said synchronism is unconfirmed.

* * * * *